United States Patent
Patel et al.

(10) Patent No.: US 10,405,686 B2
(45) Date of Patent: Sep. 10, 2019

(54) FOOD COOKING APPLIANCE UTILIZING SUPER-HEATED STEAM FOR COOKING FOOD

(71) Applicants: Bhupendra Patel, Carol Stream, IL (US); Francisco Vega, Chicago, IL (US); Chad Elliott, Frankfort, IL (US); Joseph R. Clark, Naperville, IL (US)

(72) Inventors: Bhupendra Patel, Carol Stream, IL (US); Francisco Vega, Chicago, IL (US); Chad Elliott, Frankfort, IL (US); Joseph R. Clark, Naperville, IL (US)

(73) Assignee: A. J. Antunes & Co., Carol Stream, IL (US)

( * ) Notice: Subject to any disclaimer, the term of this patent is extended or adjusted under 35 U.S.C. 154(b) by 336 days.

(21) Appl. No.: 15/407,053

(22) Filed: Jan. 16, 2017

(65) Prior Publication Data
US 2018/0199748 A1     Jul. 19, 2018

(51) Int. Cl.
*A47J 27/04*  (2006.01)
*A47J 27/14*  (2006.01)
*A47J 27/16*  (2006.01)
*A47J 27/00*  (2006.01)

(52) U.S. Cl.
CPC ........ *A47J 27/002* (2013.01); *A47J 2027/043* (2013.01)

(58) Field of Classification Search
CPC ........ A47J 27/002; A47J 27/02; A47J 27/022; A47J 27/026; A47J 27/04; A47J 27/043; A47J 27/14; A47J 27/16; A47J 27/17
See application file for complete search history.

(56) References Cited

U.S. PATENT DOCUMENTS

| | | | |
|---|---|---|---|
| 4,228,193 A | 10/1980 | Schindler et al. | |
| 4,635,812 A | 1/1987 | Mueller | |
| 5,442,997 A | 8/1995 | Branz et al. | |
| 6,389,958 B1 * | 5/2002 | Ono ........................ | A23L 3/003 422/105 |
| 2010/0151092 A1 | 6/2010 | Sus et al. | |

FOREIGN PATENT DOCUMENTS

| | | |
|---|---|---|
| EP | 2606783 | 6/2013 |
| WO | 2011/070365 | 6/2011 |

* cited by examiner

*Primary Examiner* — Michael A Laflame, Jr.
(74) *Attorney, Agent, or Firm* — Law Offices of Steven W. Weinrieb

(57) ABSTRACT

A super steam cup cooking appliance, for cooking various food products, comprises a housing, a steam generator, and an individually-sized serving cup removably attached from the appliance housing. The steam generated by the steam generator flows into a steam manifold, a steam delivery conduit, and a steam discharge pipe. A steam flux director can be removably attached to the steam discharge. Steam, generated by means of the steam generator, can thus flow into the steam manifold, through the steam delivery conduit, through the steam discharge pipe, and out from the steam flux director so as to be conducted onto the food product disposed within the individually-sized serving cup such that the food product is cooked by the steam exiting from the steam flux director. The appliance can operate either with the steam flux director attached to the steam discharge pipe, or without the steam flux director being attached to the steam discharge pipe.

18 Claims, 4 Drawing Sheets

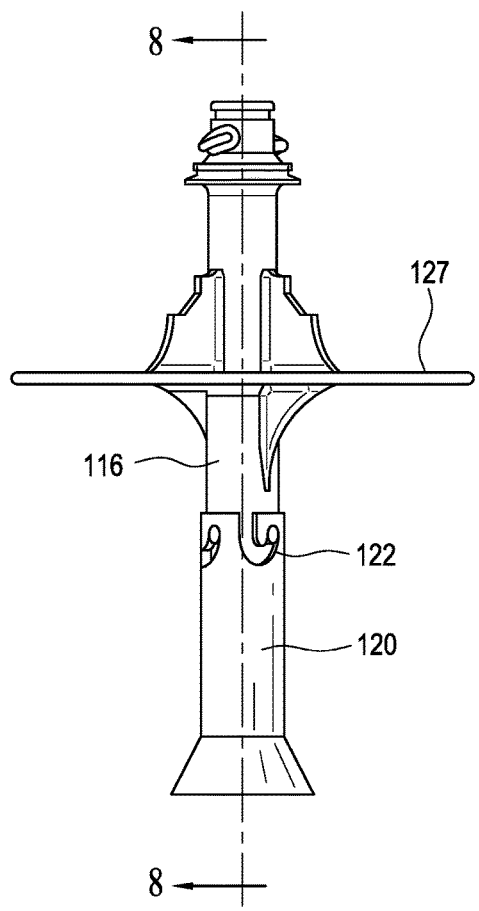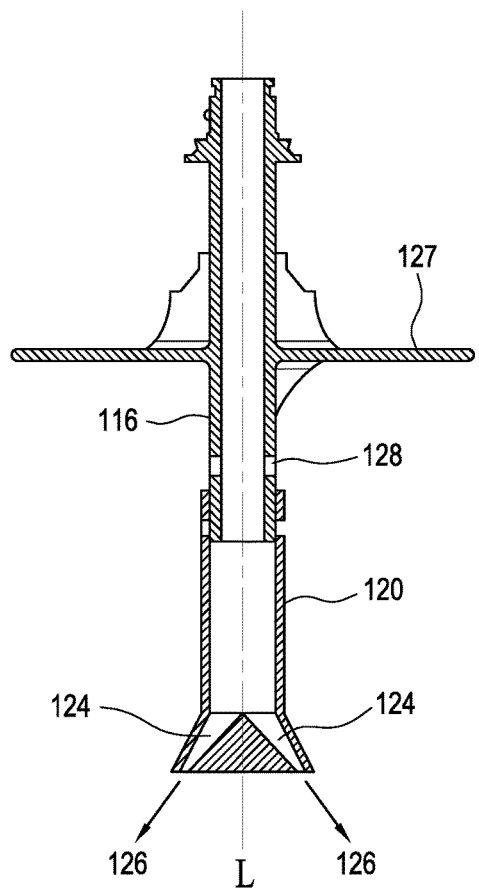
FIG. 7    FIG. 8
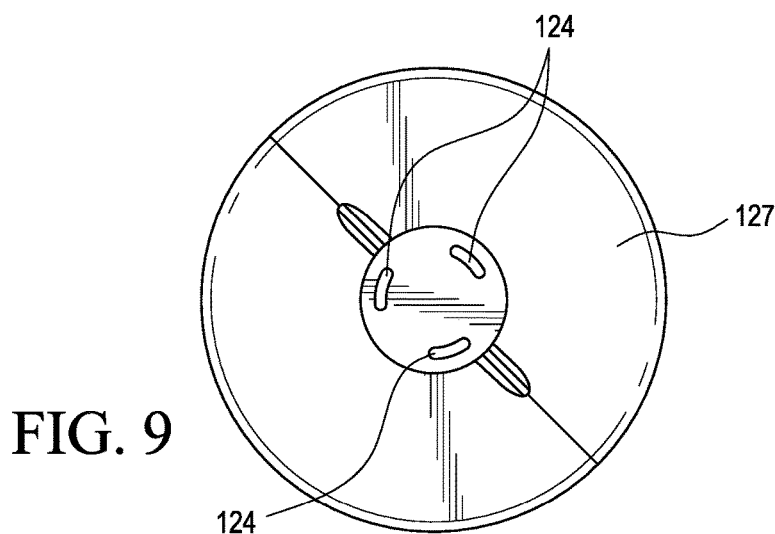
FIG. 9

FOOD COOKING APPLIANCE UTILIZING SUPER-HEATED STEAM FOR COOKING FOOD

FIELD OF THE INVENTION

The present invention relates generally to food cooking appliances, and more particularly to a new and improved cooking appliance, utilizing super-heated steam, for cooking various food products such as, for example, eggs, oatmeal, rice, chicken, vegetables, shrimp, pasta, and the like, disposed within an individual-sized cup cooker. The appliance comprises a housing, a steam generator disposed within an upper compartment of the appliance housing, and an individual-sized serving cup removably attached from an overhanging section of the appliance housing by means of, for example, any well-known quick connect/disconnect quarter-turn fastening system. The steam generated by means of the steam generator flows into a steam manifold, and a steam delivery conduit is fluidically connected to the steam manifold. A steam discharge pipe is, in turn, fluidically connected to the steam delivery conduit and is also removably mounted upon the appliance by means of a similar well-known quick connect/disconnect quarter turn fastener system. Lastly, a steam flux director is removably attached to the free or distal end of the steam discharge pipe by means of, for example, a bayonet slot type or other similar fastening system. In this manner, the steam, generated by means of the steam generator, can flow into the steam manifold, be conducted out from the steam manifold and into and through the steam delivery conduit, flow out from the steam delivery conduit and into and through the steam discharge pipe, and flow out from the steam discharge pipe and into and through the steam flux director so as to be ultimately conducted out from a plurality of steam outlets which are formed within the distal end portion of the steam flux director such that the steam is projected onto the food product disposed within the individual-sized serving cup whereby the food product is cooked by the steam exiting from the steam flux director. The appliance can be utilized either with the steam flux director attached to the steam discharge pipe, or without the steam flux director being attached to the steam discharge pipe. When the steam flux director is attached to the steam discharge pipe, the steam, discharged from outlets formed within the distal end portion of the steam flux director, are oriented in an angled, outwardly divergent manner, whereas when the steam flux director is not attached to the steam discharge pipe, the steam exiting the steam discharge pipe is oriented substantially vertically downwardly.

BACKGROUND OF THE INVENTION

Various cooking methods or procedures are of course widely employed in connection with the cooking or preparation of various different foods. For example, eggs may be grilled or poached, oatmeal may be cooked within a pot of hot water, chicken may be cooked within ovens, shrimp may be cooked within steamers, and various other food products may be cooked in boiling water. In the fast-food industry, however, such known cooking procedures are not readily adaptable to the needs of fast-food customers who order their particular food products and expect the food products to effectively be delivered to them within a time frame which may comprise only several minutes.

A need therefore exists in the art for a new and improved food cooking appliance wherein the aforenoted disadvantages or operational drawbacks characteristic of conventional food cooking appliances are effectively overcome or eliminated. More particularly, a need exists in the art for a new and improved food cooking appliance which will permit or facilitate the cooking of various different food products. Furthermore, a need exists in the art for a new and improved food cooking appliance which will permit or facilitate the cooking of various different food products in a relatively short period of time. Still further, a need exists in the art for a new and improved food cooking appliance which will permit or facilitate the cooking of various different food products in a relatively short period of time which effectively renders the appliance extremely desirable in the fast-food industry. Yet further, a need exists in the art for a new and improved food cooking appliance which will permit or facilitate the cooking of various different food products within an individually-sized serving cup.

OVERALL OBJECTIVES OF THE INVENTION

The overall objectives of the present invention are to provide a new and improved food cooking appliance wherein the aforenoted disadvantages or operational drawbacks characteristic of conventional food cooking appliances are effectively overcome or eliminated, to provide a new and improved food cooking appliance which will permit or facilitate the cooking of various different food products, to provide a new and improved food cooking appliance which will permit or facilitate the cooking of various different food products in a relatively short period of time, to provide a new and improved food cooking appliance which will permit or facilitate the cooking of various different food products in a relatively short period of time which effectively renders the appliance extremely desirable in the fast-food industry, and to provide a new and improved food cooking appliance which will permit or facilitate the cooking of various different food products within an individually-sized serving cup.

SUMMARY OF THE INVENTION

The foregoing and other objectives are achieved in accordance with the teachings and principles of the present invention through the provision of a new and improved cooking appliance, utilizing super-heated steam, for cooking various food products such as, for example, oatmeal, rice, chicken, vegetables, shrimp, eggs, pasta, and the like, disposed within an individually-sized cup cooker. The appliance comprises a housing, a steam generator disposed within an upper compartment of the appliance housing, and an individually-sized serving cup removably attached from an overhanging section of the appliance housing by means of, for example, any well-known quick connect/disconnect quarter-turn fastening system. The steam generated by means of the steam generator flows into a steam manifold, and a steam delivery conduit is fluidically connected to the steam manifold. A steam discharge pipe is, in turn, fluidically connected to the steam delivery pipe and is also removably mounted upon the appliance by means of a similar well-known quick connect/disconnect quarter turn fastener system. Lastly, a steam flux director is removably attached to the free or distal end of the steam discharge pipe by means of, for example, a bayonet slot type or other similar fastening system. In this manner, the steam, generated by means of the steam generator, can flow into the steam manifold, be conducted out from the steam manifold and into and through the steam delivery conduit, flow out from the steam delivery conduit and into and through the steam discharge pipe, and flow out from the steam discharge pipe and into and through the steam flux director so as to be ultimately conducted out from a plurality of steam outlets which are formed within the distal end portion of the steam flux director such that the steam is projected onto the food product disposed within the individually-sized serving cup whereby the food product is cooked by the steam exiting from the steam flux director. The appliance can operate or be utilized either with the steam flux director attached to the steam discharge pipe, or without the steam flux director being attached to the steam discharge pipe. When the steam flux director is attached to the steam discharge pipe, the steam, discharged from outlets formed within the distal end portion of the steam flux director in a circumferentially and equiangularly arranged array, are oriented in a substantially angled outwardly divergent manner, whereas when the steam flux director is not attached to or being utilized with the steam discharge pipe, the steam exiting from the steam discharge pipe will be oriented substantially vertically downwardly. As a result of the present invention, food product within the cup is cooked between 5-10 times faster than with conventional cooking methods. Scrambled eggs, for example, may be cooked within ten seconds, while pre-cooked rice is able to be cooked or heated within fifteen seconds as compared to two minutes within a conventional microwave oven. Similarly, raw vegetables and pre-cooked shrimp are able to be cooked or heated in only thirty seconds.

It has been operationally noted that when a steam generating cycle by the steam generator has been terminated, a backflow or suction tends to be developed within the system, that is, within the steam discharge pipe. This is believed to occur due to the termination in the flow of steam through the steam discharge pipe, as well as a substantial drop in temperature internally within the steam discharge pipe, due to the termination of the steam-generating cycle. In order to prevent this backflow or suction from occurring, which could conceivably entrain some of the cooked food product back up into the steam discharge pipe whereby the cooked food product could then effectively be mixed with a different food product to be cooked when a new steam generation cycle is commenced, a plurality of vents are provided upon the steam discharge pipe, at an axial position adjacent to the bayonet connection defined between the steam flux director and the steam discharge pipe, so as to effectively entrain ambient air into the steam flux director when the steam generation cycle is terminated. This entrained air effectively blocks, interrupts, or prevents any backflow or suction from being developed within the steam discharge pipe such that no cooked food product is sucked back into the steam discharge pipe, no cooked food product can collect upon internal peripheral surface portions of the steam discharge pipe, and no cooked food can effectively be disposed within the longitudinal flow passageway of the steam discharge pipe. In this manner, a food product, cooked during a subsequent food cooking cycle, will not be contaminated by any residual cooked food product that was cooked during a previous food cooking cycle. It is lastly noted that the steam generated by means of the steam generated has a temperature of approximately 220° F., while the temperature of the steam, actually supplied to and projected onto the food product to be cooked, is approximately 212° F., due to some entrained ambient air flowing through the plurality of vents as the steam flows through the steam discharge pipe and/or the steam flux director if the steam flux director is in fact attached to the steam discharge pipe.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 7 is a side elevational view of the sub-assembly of the food cooking appliance wherein the steam flux director is removably mounted upon the steam discharge pipe by means of suitable bayonet fastener connections;

FIG. 8 is a cross-sectional view of the sub-assembly of the food cooking appliance comprising the steam flux director as removably mounted upon the steam discharge pipe, as taken along the lines 8-8 in FIG. 7, and particularly disclosing the radially outward divergent disposition of the steam outlets provided within the distal portion of the steam flux director; and FIG. 9 is a bottom plan view of the sub-assembly of the food cooking appliance comprising the steam flux director as removably mounted upon the steam discharge pipe and disclosing steam outlets provided within the distal end portion of the steam flux director and arranged within an equiangularly spaced circumferential array.

DETAILED DESCRIPTION OF THE PREFERRED EMBODIMENT

Figure 1:
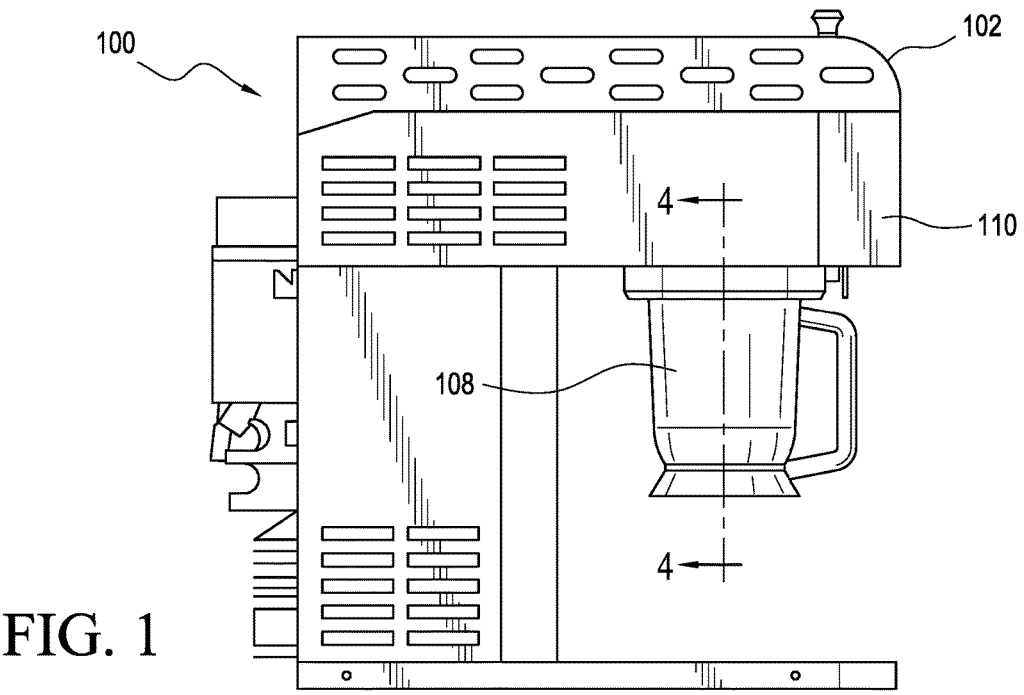
FIG. 1 is a left side elevational view of the new and improved food cooking appliance constructed in accordance with the principles and teachings of the present invention and illustrating the cooperative parts thereof.
Figure 2:
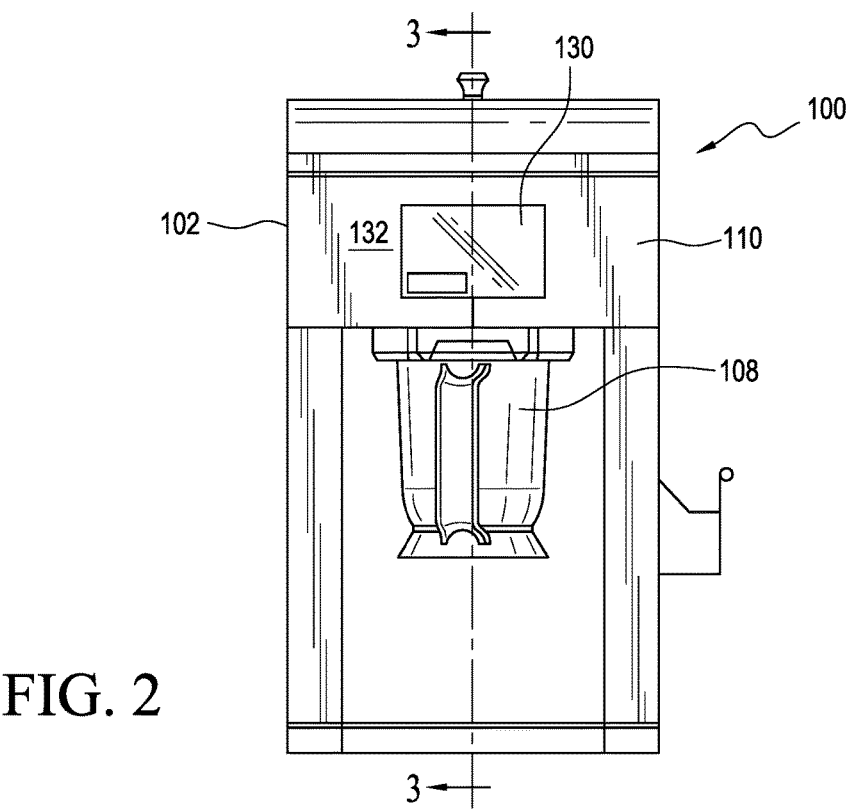
FIG. 2 is a front elevational view of the new and improved food cooking appliance as illustrated within FIG. 1.
Figure 3:
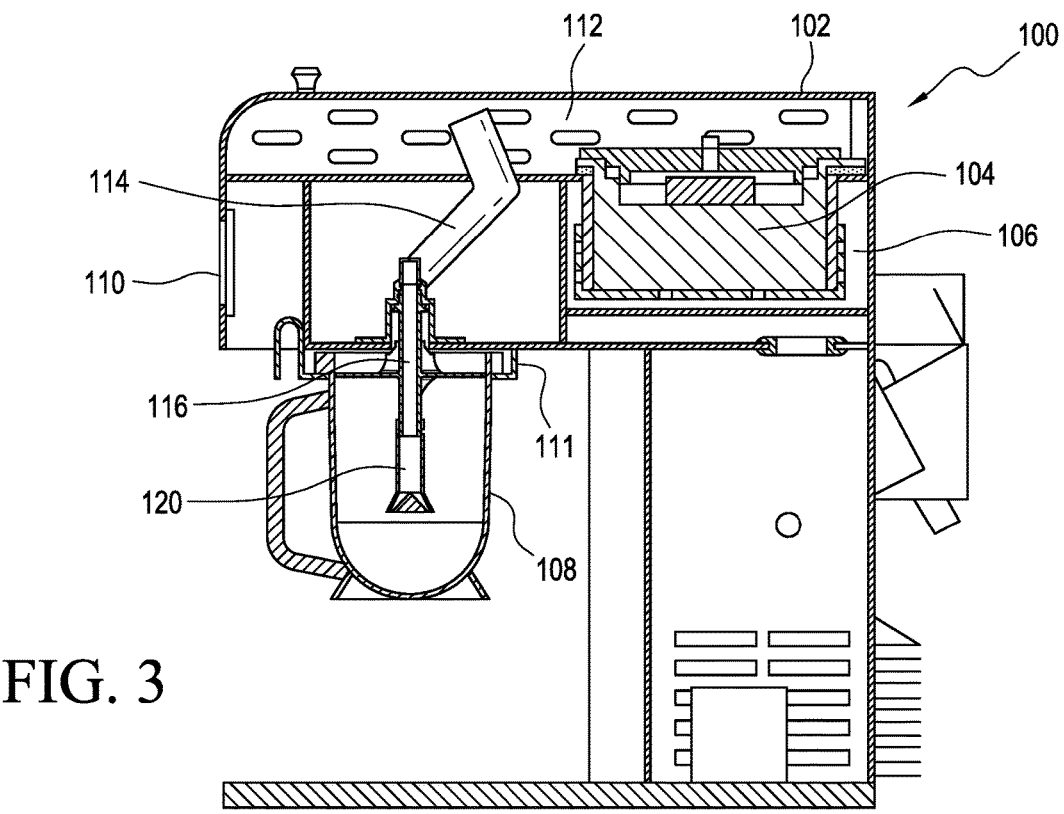
FIG. 3 is a left side cross-sectional view of the new and improved food cooking appliance as illustrated within FIG. 2 and as taken along the line 3-3 of FIG. 2.

Referring now to the drawings, and more particularly to FIGS. 1-9 thereof, as will sometimes be noted specifically, a new and improved cooking appliance, utilizing superheated steam for cooking various food products, such as, for example, eggs, oatmeal, rice, chicken, vegetables, shrimp, pasta, and the like, that are disposed within an individually-sized cup cooker, is illustrated and is generally indicated by the reference character 100. The appliance 100 comprises a housing 102, and a steam generator 104 that is disposed within an upper compartment 106 of the appliance housing 100. The steam generator 104 may simply comprise, for example, an aluminum plate which has a heating element disposed internally therewithin and which is adapted to be heated to a temperature of approximately 350° F. Accordingly, when cold water is effectively splashed or deposited onto the heated plate, steam is created. An individually-sized food product serving cup 108 is removably attached from an overhanging section 110 of the appliance housing 100 by means of, for example, any well-known quick connect/disconnect quarter-turn fastening system 111. The steam generated by means of the steam generator flows into a steam manifold 112, and a steam delivery conduit 114 is fluidically connected to the steam manifold 112. A steam discharge pipe 116 is, in turn, fluidically connected to the steam delivery conduit 114 and is also removably mounted upon the appliance 100 by means of a similar well-known quick connect/disconnect quarter turn fastener system 118 which is partially shown in FIG. 5.

Figure 4:
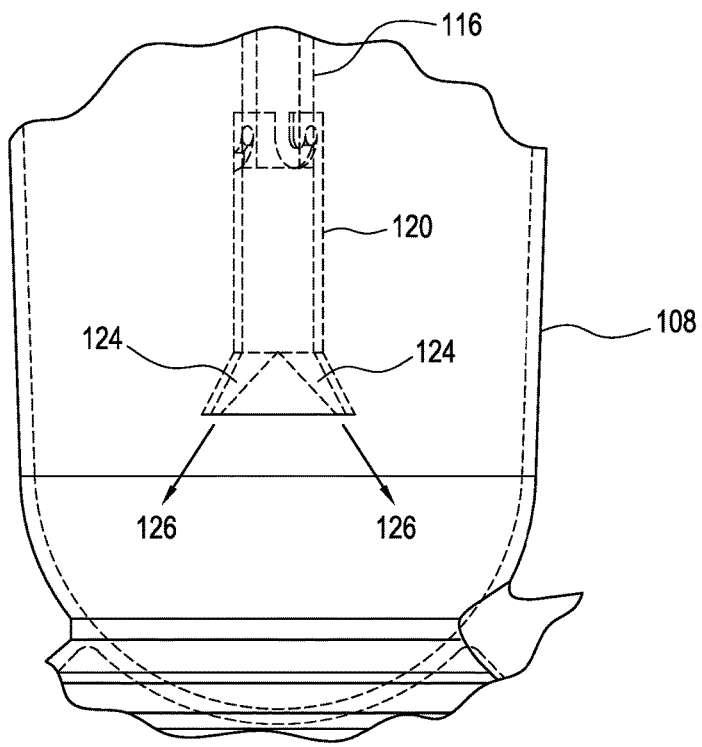
FIG. 4 is an enlarged cross-sectional view illustrating the relative disposition of the individual serving size cup and the steam flux director as illustrated within FIG. 1 and taken along the lines 4-4 of FIG. 1.
Figure 5:
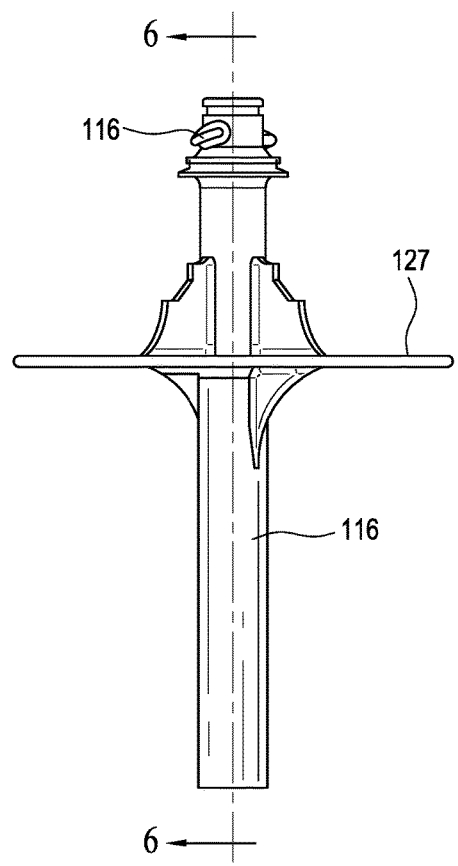
FIG. 5 is a side elevational view of the steam discharge pipe that is adapted to be removably connected to the steam delivery conduit, as can be best appreciated from FIG. 3 by means of quick connect/disconnect quarter-turn fastener mechanisms which can best be seen in FIG. 5.

Lastly, a steam flux director 120 is removably attached to the free or distal end of the steam discharge pipe 116 by means of, for example, a bayonet slot type or other similar fastening system 122 as can best be seen in FIG. 7. In this manner, the steam, generated by means of the steam generator 104, can flow into the steam manifold 112, be conducted out from the steam manifold 112 and into and through the steam delivery conduit 114, flow out from the steam delivery conduit 114 and into and through the steam discharge pipe 116, and flow out from the steam discharge pipe 116 and into and through the steam flux director 120 so as to be ultimately conducted out from a plurality of, for example, three, steam outlets 124, as can best be seen in FIG. 9, that are formed within the distal end portion of the steam flux director 120 such that the steam is projected onto the food product disposed within the individually-sized serving cup 108 whereby the food product is cooked by the steam exiting from the steam flux director 120. The appliance 100 can operate either with the steam flux director 120 attached to the steam discharge pipe 116, or without the steam flux di-rector 120 being attached to the steam discharge pipe 116. When the steam flux director 120 is attached to the steam discharge pipe 116, the steam, discharged from the steam outlets 124, formed within the distal end portion of the steam flux director 120 in a circumferentially and equiangularly spaced array, are oriented in a substantially angled divergent manner, as schematically illustrated by means of the arrows 126, as seen in FIGS. 4 and 8, so as to be disposed at a predetermined angle with respect to the longitudinal axis L of the steam flux director and thereby disperse the steam onto the food product disposed within the food product serving cup 108, whereas when the steam flux director 120 is not being utilized, and is not attached to the steam discharge pipe 116, the steam exiting from the steam discharge pipe 116 is oriented substantially vertically downwardly onto the food disposed within the food product serving cup 108. In connection with the discharge of the steam from the steam discharge pipe 116, it is also noted that an anti-splash circular disk 127, as can best be seen in FIGS. 5-9, is integrally formed upon the steam discharge pipe 116 so as to prevent any of the cooked food from splashing upwardly toward the overhanging section 110 of the appliance housing 102 and into the housing 102 where, for example, the steam delivery conduit 114 is disposed.

Figure 6:
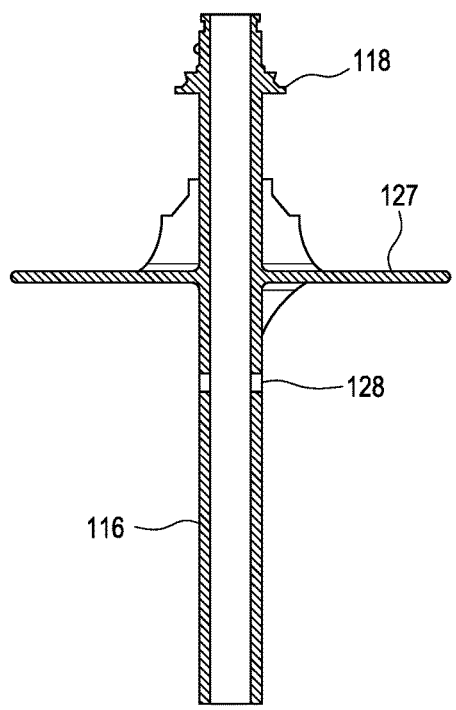
FIG. 6 is a cross-sectional view of the steam discharge pipe as taken along lines 6-6 of FIG. 5 wherein the ambient air vents can be seen.

It has been operationally noted that, when the steam flux director 120 is not being utilized and is therefore not mounted upon the distal end portion of the steam discharge pipe 116, some backflow or suction tends to occur periodically when the steam generator 104 has ended a steam generating cycle. This is believed to occur due to the termination in the flow of steam through the steam discharge pipe 116, as well as a substantial drop in temperature internally within the steam discharge pipe 116 due to the termination of the steam-generating cycle. In order to prevent this backflow or suction from occurring, which could conceivably entrain some of the cooked food product back up into the steam discharge pipe 116 whereby the cooked food product could then effectively be mixed with a different food product to be cooked when a new steam generation cycle is commenced, a plurality of vents 128, as can best be seen in FIGS. 6 and 8, are provided upon the steam discharge pipe 116, at an axial position adjacent to, and just above, the bayonet connection 122 defined between the steam flux director 120 and the steam discharge pipe 116, so as to effectively entrain ambient air into the steam discharge pipe 116 when the steam generation cycle is terminated. This entrained air effectively blocks, interrupts, or prevents any backflow or suction from being developed within the steam discharge pipe 116 such that no cooked food product is sucked back into the steam discharge pipe 116, no cooked food product can collect upon internal peripheral surface portions of the steam discharge pipe 116, and no cooked food can effectively be disposed within the longitudinal flow passageway of the steam discharge pipe 116. In this manner, a food product, cooked during a subsequent food cooking cycle, will not be contaminated by any residual cooked food product that was cooked during a previous food cooking cycle. It is lastly noted that the steam generated by means of the steam gene-rated has a temperature of approximately 220° F., while the temperature of the steam, actually supplied to and projected onto the food product to be cooked, is approximately 212° F., due to some entrained ambient air flowing through the plurality of vents 128 as the steam flows through the steam discharge pipe 116 and the steam flux director 120 when the steam flux director 120 is attached to the steam discharge pipe 116.

It is lastly noted that periodically, the appliance 100 can be cleaned or purged by removing the steam flux director 120 from the steam discharge pipe 116, if the steam flux director 120 had in fact been connected to the steam discharge pipe 116 during a particular steam generation cycle by the steam generator 104, as well as removing the individually-sized serving cup 108 from the appliance 100. A purging or cleaning cycle can then be implemented by having the steam generator 104 once again generate steam, and conducting the steam through the steam manifold 112, the steam delivery conduit 114, and the steam discharge pipe 116. In order to control or implement the various cooking and cleaning or purging cycles of the appliance, a touch screen user interface 130 is mounted upon a front face portion 132 of the appliance housing 102 as can best be seen in FIG. 2.

Obviously, many variations and modifications of the present invention are possible in light of the above teachings. It is therefore to be understood that within the scope of the appended claims, the present invention may be practiced otherwise than as specifically described herein.

REFERENCE NUMBER KEY

100—Appliance of Present Invention
102—Housing of appliance 100
104—Steam generator
106—Compartment for steam generator
108—Individually-sized serving/cooking cup
110—Front overhang portion of housing 102
111—Quarter-turn fastening system for mounting cup 108 onto housing 102
112—Steam manifold 114—Steam delivery conduit
116—Steam discharge pipe
118—Quick connect/disconnect fastening system for steam discharge pipe
120—Steam flux director
122—Bayonet connection between flux director and discharge pipe
124—Steam outlets in steam flux director
126—Arrows schematically illustration flow of steam from steam flux director
127—Anti-splash guard of steam discharge pipe 116
128—Ambient air vents in steam discharge pipe
130—Touch screen user interface
132—Front face of appliance housing 102
L—Longitudinal axis of steam discharge pipe 116

What is claimed as new and desired to be protected by Letters Patent, is:

1. A food cooking appliance for cooking or heating a food product disposed within a food product serving cup, comprising:
   a housing;
   a food product serving cup containing a food product to be cooked or heated and mounted upon said housing;
   a steam generator, disposed within said housing, for generating steam;
   a steam discharge pipe fluidically connected at a first end thereof to said steam generator;
   a steam flux director fluidically connected at a first end thereof to a second end of said steam discharge pipe, and fluidically connected at a second end thereof to said food product serving cup, such that steam, generated by said steam generator, can be discharged into said food product serving cup so as to cook or heat the food product disposed within said food product serving cup; and
   wherein said steam flux director is removably connected to said steam discharge pipe by bayonet connector fasteners.

2. The food cooking appliance as set forth in claim 1, wherein:
   said food product serving cup is removably mounted upon said housing of said appliance by quick connect/disconnect fasteners.

3. The food cooking appliance as set forth in claim 1, wherein:
   said food product serving cup comprises an individually-sized serving cup.

4. The food cooking appliance as set forth in claim 1, further comprising:
   a steam manifold into which steam from said steam generator can flow.

5. The food cooking appliance as set forth in claim 1, wherein:
   said steam flux director is removably connected to said steam discharge pipe.

6. The food cooking appliance as set forth in claim 1, wherein:
   a plurality of steam outlets are defined within said second end of said steam flux director.

7. The food cooking appliance as set forth in claim 6, wherein:
   said plurality of steam outlets comprises three steam outlets.

8. The food cooking appliance as set forth in claim 7, wherein:
   each one of said three steam outlets is disposed at a predetermined acute angle with respect to the longitudinal axis of said steam flux generator such that the steam discharged from said three steam outlets is dispersed onto the food product disposed within said food product serving cup in a radially outwardly divergent manner.

9. The food cooking appliance as set forth in claim 1, wherein:
   vents are provided within said steam discharge pipe for permitting ambient air to flow therethrough in order to prevent backflow or suction to occur within said steam discharge pipe when a steam generation cycle has been terminated.

10. The food cooking appliance as set forth in claim 1, wherein:
    said steam discharge pipe is provided with an anti-splash circular disc for preventing any cooked food product from moving upwardly into said housing of said food appliance.

11. The food cooking appliance as set forth in claim 1, further comprising:
    a user interface mounted upon said appliance housing for controlling cooking operations of said food cooking appliance.

12. A food cooking appliance for cooking or heating a food product disposed within a food product serving cup, comprising:
    a housing;
    a food product serving cup containing a food product to be cooked or heated and mounted upon said housing;
    a steam generator, disposed within said housing, for generating steam;
    a steam flux director fluidically connected at a first end thereof to said steam generator, and fluidically connected at a second end thereof to said food product serving cup, such that steam, generated by said steam generator, can be discharged into said food product serving cup so as to cook or heat the food product disposed within said food product serving cup; and
    wherein a plurality of steam outlets, disposed within an equiangularly spaced circumferential array, are defined within said second end of said steam flux director.

13. The food cooking appliance as set forth in claim 12, wherein:
    said plurality of steam outlets comprises three steam outlets.

14. The food cooking appliance as set forth in claim 13, wherein:
    each one of said three steam outlets is disposed at a predetermined acute angle with respect to the longitudinal axis of said steam flux generator such that the steam discharged from said three steam outlets is dispersed onto the food product disposed within said food product serving cup in a radially outwardly divergent manner.

15. The food cooking appliance as set forth in claim 12, wherein:
    a steam discharge pipe is fluidically connected at a first end thereof to said steam generator; and
    said first end of said steam flux director is fluidically connected to said steam discharge pipe.

16. The food cooking appliance as set forth in claim 15, wherein:
    vents are provided within said steam discharge pipe for permitting ambient air to flow therethrough in order to prevent backflow or suction to occur within said steam discharge pipe when a steam generation cycle has been terminated.

17. The food cooking appliance as set forth in claim 15, wherein:
- said steam discharge pipe is provided with an anti-splash circular disc for preventing any cooked food product from moving upwardly into said housing of said food appliance.

18. The food cooking appliance as set forth in claim 12, further comprising:
- a user interface mounted upon said appliance housing for controlling cooking operations of said food cooking appliance.

* * * * *